United States Patent
Hori et al.

(10) Patent No.: US 11,204,261 B2
(45) Date of Patent: Dec. 21, 2021

(54) ROTATIONAL POSITION DETECTION DEVICE

(71) Applicant: Mitsubishi Electric Corporation, Tokyo (JP)

(72) Inventors: Shusuke Hori, Tokyo (JP); Yosuke Yui, Tokyo (JP); Yu Kawano, Tokyo (JP); Masahiro Kanamaru, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/342,022

(22) PCT Filed: Nov. 16, 2016

(86) PCT No.: PCT/JP2016/083943
§ 371 (c)(1),
(2) Date: Apr. 15, 2019

(87) PCT Pub. No.: WO2018/092207
PCT Pub. Date: May 24, 2018

(65) Prior Publication Data
US 2019/0265070 A1    Aug. 29, 2019

(51) Int. Cl.
*G01D 5/14* (2006.01)
*G01D 11/24* (2006.01)
(Continued)

(52) U.S. Cl.
CPC .............. *G01D 5/145* (2013.01); *G01D 11/24* (2013.01); *G01D 11/30* (2013.01); *H02K 11/215* (2016.01)

(58) Field of Classification Search
CPC .............................. G01D 5/145; H02K 11/215
See application file for complete search history.

(56) References Cited

U.S. PATENT DOCUMENTS

| 9,360,295 | B2* | 6/2016 | Taniguchi | G01D 5/145 |
| 2014/0021003 | A1* | 1/2014 | Nakano | F16D 27/112 192/84.9 |

(Continued)

FOREIGN PATENT DOCUMENTS

| CN | 203289274 U | 11/2013 |
| CN | 104124827 A | 10/2014 |

(Continued)

OTHER PUBLICATIONS

International Search Report of PCT/JP2016/083943 dated Dec. 27, 2016 [PCT/ISA/210].

(Continued)

*Primary Examiner* — Minh Q Phan
(74) *Attorney, Agent, or Firm* — Sughrue Mion, PLLC; Richard C. Turner

(57) ABSTRACT

To provide a rotational position detecting device in which a rotational position detection error caused by variation in distance between a sensor magnet and a magnetic sensor is reduced, the rotational position detecting device includes a sensor magnet (30) configured to generate a magnetic flux; a holder (34), which is configured to hold the sensor magnet, and has a pressure-contact portion (340) to be fixed to a shaft (40) of a motor (1); and a magnetic sensor (32) configured to detect the magnetic flux generated by the sensor magnet, the magnetic sensor being directly or indirectly fixed to the motor, and being arranged away from the sensor magnet in an axial direction of the shaft, the shaft having an abutment portion (403, 405) configured to receive a distal end portion (341) of the pressure-contact portion.

13 Claims, 3 Drawing Sheets

(51) Int. Cl.
   *G01D 11/30*   (2006.01)
   *H02K 11/215*  (2016.01)

(56) References Cited

U.S. PATENT DOCUMENTS

| | | | |
|---|---|---|---|
| 2014/0312746 A1 | 10/2014 | Taniguchi | |
| 2016/0285331 A1 | 9/2016 | Ichikawa et al. | |
| 2016/0352190 A1* | 12/2016 | Hieda | H02K 11/01 |
| 2017/0349211 A1* | 12/2017 | Shiino | G01B 7/30 |

FOREIGN PATENT DOCUMENTS

| | | |
|---|---|---|
| CN | 204271862 U | 4/2015 |
| CN | 105762992 A | 7/2016 |
| CN | 205490000 U | 8/2016 |
| CN | 106104986 A | 11/2016 |
| JP | 1-113566 U | 7/1989 |
| JP | 11-308812 A | 11/1999 |
| JP | 2006-029969 A | 2/2006 |
| JP | 2013-247743 A | 12/2013 |
| JP | 2014-057431 A | 3/2014 |
| JP | 2015-065789 A | 4/2015 |
| JP | 2015-177649 A | 10/2015 |
| JP | 2016-127709 A | 7/2016 |
| KR | 10-2014-0078793 A | 6/2014 |
| WO | 2015/140961 A1 | 9/2015 |

OTHER PUBLICATIONS

Office Action dated Jun. 3, 2020 in Chinese Application No. 201680090583.9.

Office Action dated May 12, 2020 in Japanese Application No. 2018-550912.

Office Action dated Nov. 11, 2020 from the China National Intellectual Property Administration in Application No. 201680090583.9.

* cited by examiner

ROTATIONAL POSITION DETECTION DEVICE

CROSS REFERENCE TO RELATED APPLICATIONS

This application is a National Stage of International Application No. PCT/JP2016/083943, filed Nov. 16, 2016.

TECHNICAL FIELD

The present invention relates to a rotational position detecting device, and more particularly, to a rotational position detecting device including a sensor magnet, which is mounted to a rotating portion such as a shaft of an electric power steering drive motor, and a magnetic sensor, which is mounted to a non-rotating portion such as a motor housing.

BACKGROUND ART

As a related art rotational position detecting device configured to detect a rotational speed and a rotational position of a motor, there has hitherto been known a rotational position detecting device including a position detection magnet as a sensor magnet and a sensor board as a magnetic sensor (see Patent Literature 1, for example). The sensor magnet in this case is a member that is fixed to a rotating portion such as a motor shaft directly or through intermediation of a fixing member such as a holder, and is configured to generate a magnetic flux for detecting a rotational position. The sensor magnet has an annular shape and is arranged in a circumferential direction of a rotary shaft, or has a circular shape and is arranged at an end of the rotary shaft. The magnetic sensor is an element that is mounted to a non-rotating portion such as a motor housing, and is configured to detect a change in magnetic flux caused by rotation of the sensor magnet and output a signal corresponding to the change. With this signal, a rotational position of the motor shaft or other member is detected.

Moreover, there has hitherto been known another rotational position detecting device including a rotational position detection magnet and a fixed member. The rotational position detection magnet is arranged in a space partitioned by a tubular first peripheral wall part and a bottom wall part extending inward from an end portion of the first peripheral wall part in an axial direction, and is configured to generate a magnetic flux for detecting a rotational position of a rotating body. The fixed member is made of a non-magnetic material and is fixed to a rotary shaft of the rotating body. The fixed member has a plurality of protrusions, which are formed at intervals in a circumferential direction and protrude inward, on an inner peripheral face of the first peripheral wall part in the above-mentioned space (see Patent Literature 2, for example).

CITATION LIST

Patent Literature

[PTL 1] JP 2015-65789 A
[PTL 2] JP 2014-57431 A

SUMMARY OF INVENTION

Technical Problem

With the rotational position detecting device of Patent Literature 1 described above, when variation in distance or inclination occurs between the sensor magnet and the magnetic sensor, a "rotational position detection error" occurs. This "rotational position detection error" is caused by fluctuation in magnetic flux that is required for detection by the magnetic sensor due to the variation in distance between the sensor magnet and the magnetic sensor, or is caused by magnetic flux fluctuation due to the variation in distance between the sensor magnet and the magnetic sensor during rotation due to the inclination between the sensor magnet and the magnetic sensor. As a result, there has been a problem in that generated torque is fluctuated, and performance is degraded.

Moreover, in Patent Literature 1, a holder configured to hold the sensor magnet is held by the shaft, and a member for regulating the distance to the magnetic sensor is not provided, with the result that variation in distance between the sensor magnet and the magnetic sensor is liable to occur, and thus positioning management is required during assembling. Moreover, the sensor magnet which has an annular shape and is arranged in the circumferential direction of the rotary shaft is arranged away from the rotary shaft, and hence the inclination of the holder causes large variation in distance between the sensor magnet and the magnetic sensor during rotation. Therefore, a large "rotational position detection error" is caused.

Further, also in Patent Literature 2, a holder configured to hold a sensor magnet is held by a shaft, and a member for regulating a distance to a magnetic sensor is not provided, with the result that variation in distance between the sensor magnet and the magnetic sensor is liable to occur.

The present invention has been made to solve the above-mentioned problem, and has an object to provide a rotational position detecting device in which a rotational position detection error caused by variation in distance between a sensor magnet and a magnetic sensor is reduced.

Solution to Problem

According to one embodiment of the present invention, there is provided a rotational position detecting device, including: a sensor magnet configured to generate a magnetic flux; a holder, which is configured to hold the sensor magnet, and has a pressure-contact portion to be fixed to a shaft of a motor; and a magnetic sensor configured to detect the magnetic flux generated by the sensor magnet, the magnetic sensor being directly or indirectly fixed to the motor, and being arranged away from the sensor magnet in an axial direction of the shaft, the shaft having an abutment portion configured to receive a distal end portion of the pressure-contact portion.

Advantageous Effects of Invention

According to the present invention, the shaft includes the abutment portion configured to receive the distal end portion of the pressure-contact portion of the holder configured to hold the sensor magnet, which is arranged to be opposed to the magnetic sensor to be fixed to the shaft of the motor. Thus, the distance between the sensor magnet and the magnetic sensor is regulated, with the result that the variation in distance is suppressed, and the rotational position detection error can be reduced.

DESCRIPTION OF EMBODIMENTS

Now, rotational position detecting devices according to embodiments of the present invention are described in detail with reference to FIG. 1 to FIG. 6 through description of an example case in which the rotational position detecting device is applied to an electric power steering motor as an example.

First Embodiment

Figure 1:
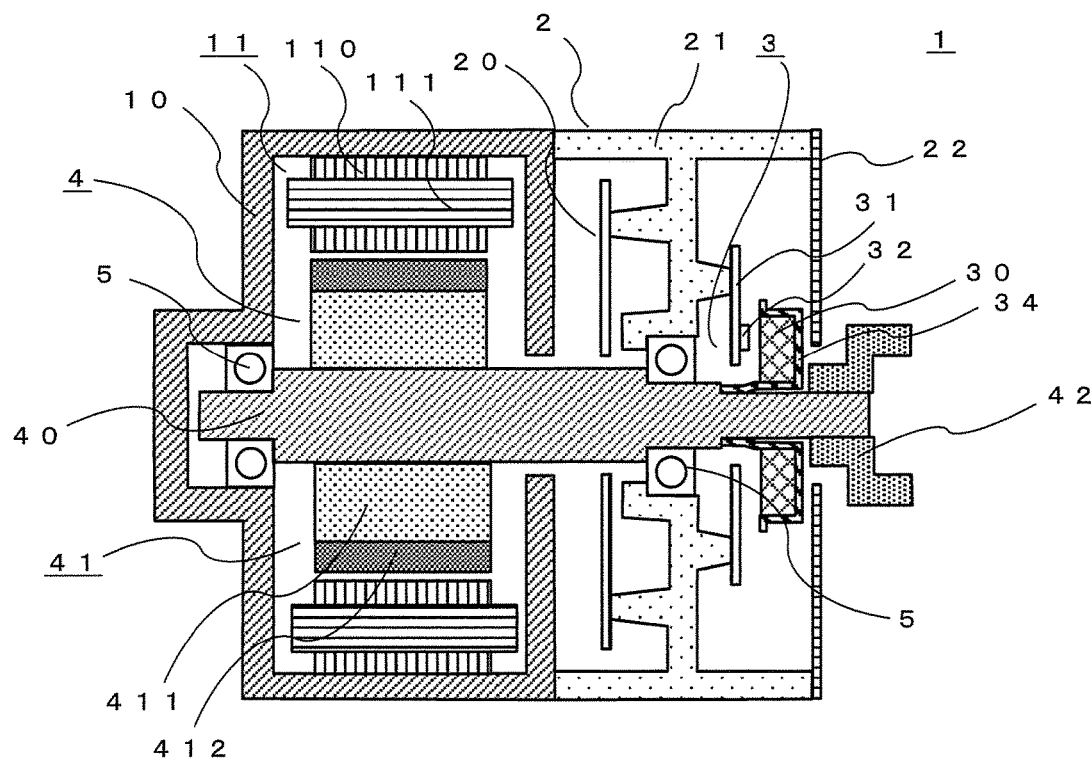
FIG. 1 is a sectional view of a motor including a rotational position detecting device according to a first embodiment of the present invention.

A motor 1 illustrated in FIG. 1 includes a motor housing 10, a stator 11 mounted to the motor housing 10, a rotating body 4 provided in the stator 11, a controller 2 connected to the motor housing 10, a rotational position detecting device 3 provided in the controller 2, and a shaft 40 passing through the rotating body 4 and the controller 2 through intermediation of bearings 5.

The stator 11 includes a stator core 110 and windings 111. The stator core 110 has a cylindrical shape and is made of a magnetic material. The windings 111 are wound around the stator core 110. When a predetermined electrical current is supplied to the windings 111, a rotating magnetic field is generated in the stator core 110.

The rotating body 4 includes a rotor 41, the shaft 40, and a boss 42, and is held through intermediation of the bearings 5 so as to be rotatable. The rotor 41 is arranged so as to be opposed to an inner peripheral face of the stator 11, and includes a rotor core 411 and a magnet 412. The rotor core 411 has a cylindrical shape and is made of a magnetic material. The magnet 412 is arranged on an outer periphery of the rotor core 411. With this configuration, the rotating magnetic field generated in the stator core 110 gives a rotational force to the rotating body 4. The rotational force is transferred to an external steering (not shown) through the boss 42.

The rotational position detecting device 3 includes a sensor magnet 30, a holder 34, a magnetic sensor 32, and a magnetic sensor board 31. The sensor magnet 30 is made of a plastic magnet material, and is configured to generate a magnetic flux and rotate integrally with the rotating body 4 through intermediation of the shaft 40.

Figure 2:
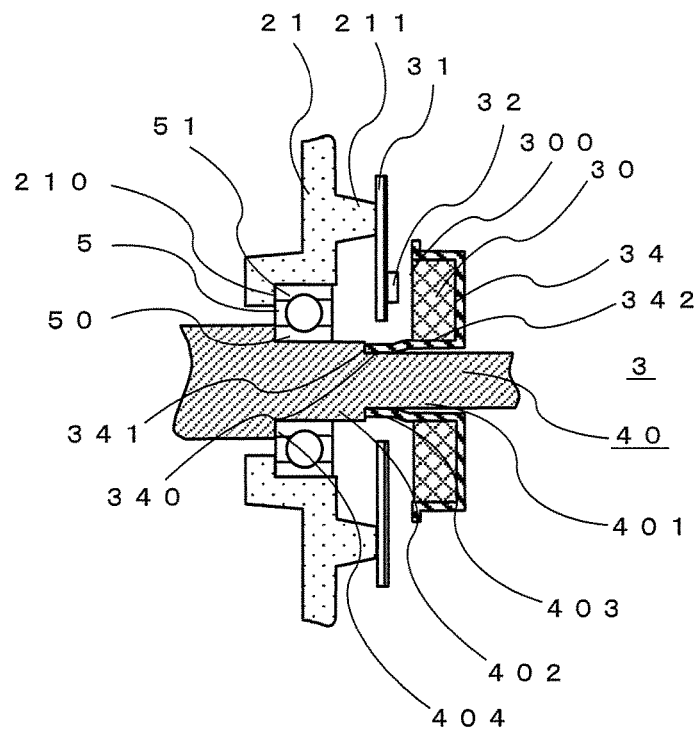
FIG. 2 is a sectional view of the rotational position detecting device according to the first embodiment of the present invention.

As illustrated in FIG. 2, the shaft 40 has a step portion 403 between a small-diameter portion 401 and a large-diameter portion 402. The small-diameter portion 401 is located at a part of the shaft 40 corresponding to the sensor magnet 30, and the large-diameter portion 402 is located on the rotor 41 side. Moreover, a bearing inner ring abutment portion 404 of the shaft 40 forms another step portion 404 configured to receive a bearing inner ring 50 of a bearing 5 in cooperation with the large-diameter portion 402.

The holder 34 is made of a non-magnetic metal material. The holder 34 is configured to hold, for example, the sensor magnet 30 as a resin magnet, and is fitted and fixed to the shaft 40 by a pressure-contact portion 340 having a cylindrical shape. A distal end portion 341, which is formed on the rotor 41 side of the pressure-contact portion 340 and extends in an axial direction, is brought into abutment against the step portion 403 between the small-diameter portion 401 and the large-diameter portion 402 of the shaft 40 and is positioned thereto.

Moreover, the holder 34 is integrated to the sensor magnet 30 by insert molding. A sensor-side face 300 of the sensor magnet 30 is formed so as to be parallel to the distal end portion 341 of the holder 34 and perpendicular to a center axis of the pressure-contact portion 340 having a cylindrical shape.

The magnetic sensor 32 is configured to detect a change in magnetic flux of the rotating sensor magnet 30, and output a signal corresponding to the change. Moreover, the magnetic sensor 32 is arranged away from the sensor magnet 30 in the axial direction to be opposed to the sensor-side face 300. The magnetic sensor board 31 transmits the signal to the controller 2. Moreover, the magnetic sensor board 31 having the magnetic sensor 32 mounted thereon is fixed to a controller housing 21 by screws or other members. A bearing outer ring 51 is fitted into the controller housing 21, and is brought into abutment against a bearing outer ring abutment portion 210 in the axial direction to be positioned thereto.

As illustrated in FIG. 1, the controller 2 includes a control board 20, the controller housing 21, and a controller cover 22. The control board 20 receives a detection signal from the rotational position detecting device 3, and controls electric currents in the windings 111 of the stator 11 based on a control signal from, for example, a microcomputer. As a result, the rotating body 4 is rotated, and required rotational force is given to the motor 1.

Moreover, when the rotational position detecting device 3 is to be arranged on the side of the boss 42 configured to transfer rotational force of the shaft 40, the sensor magnet 30 has an annular shape and is arranged in an outer peripheral direction of the shaft 40. On this occasion, the holder 34 has a shaft relief portion 342 for the shaft 40 in a part located on an inner periphery of the sensor magnet 30. This arrangement is adopted for reducing stress generated on the sensor magnet 30 by thermal expansion of the shaft 40 and preventing the sensor magnet 30 from being damaged.

Next, actions and effects of the first embodiment of the present invention are described.

According to the first embodiment, the holder 34 configured to hold the sensor magnet 30 is configured such that the distal end portion 341 located at the distal end of the cylindrical pressure-contact portion 340 is brought into abutment against the step portion 403 between the small-diameter portion 401 and the large-diameter portion 402 of the shaft 40.

Further, the bearing inner ring 50 is positioned by the another step portion 404 formed in the shaft 40. Moreover, the magnetic sensor board 31 having the magnetic sensor 32 mounted thereon is fixed to the controller housing 21 by the screws or other members. The bearing outer ring 51 is fitted into the controller housing 21, and is brought into abutment against the bearing outer ring abutment portion 210 and the abutment portion 404 to be positioned thereat.

Therefore, the variation in distance between the sensor magnet 30 and the magnetic sensor 32 can be suppressed through an increase in accuracy of structural members including the holder 34, the shaft 40, the bearing 5, and the controller housing 21, which are interposed between the sensor magnet 30 and the magnetic sensor 32.

The increase in accuracy of the structural members can be achieved by the following method.

With regard to the holder 34, dimensional accuracy between a mounting face of the sensor magnet 30 and the pressure-contact portion 340, which extends in the axial direction, is increased by sheet metal drawing through mold pressing.

Moreover, with regard to the shaft 40, dimensional accuracy between the bearing inner ring abutment portion 404 and the step portion 403, which is formed between the small-diameter portion 401 and the large-diameter portion 402, is increased by machining.

Further, with regard to the controller housing 21, accuracy is increased through molding of the entire housing by die casting or other method, and partial machining on the bearing outer ring abutment portion 210 and a substrate support portion 211 of the magnetic sensor board 31. Accuracy of the bearing 5 can be secured in advance by a ready-made product.

Therefore, through the increase in accuracy of the structural members including the holder 34, the shaft 40, the bearing 5, and the controller housing 21, which are interposed between the sensor magnet 30 and the magnetic sensor 32, the distal end portion 341 of the holder 34 configured to hold the sensor magnet 30 can be brought into abutment against the step portion 403 between the small-diameter portion 401 and the large-diameter portion 402 of the shaft 40, and the bearing inner ring 50 is brought into abutment against the large-diameter portion 402 and the step portion 404 for assembly. As a result, assembly management can be easily carried out, and the variation in distance between the sensor magnet 30 and the magnetic sensor 32 can be suppressed.

Further, the holder 34 is integrated to the sensor magnet 30 by insert molding. As a result, the sensor-side face 300 of the sensor magnet 30 is formed so as to be parallel to the distal end portion 341 of the holder 34 and perpendicular to the center axis of the cylindrical pressure-contact portion 340. Therefore, through insert molding of the sensor-side face 300 so as to be parallel to the distal end portion 341 and perpendicular to the center axis of the pressure-contact portion 340, irrespective of profile irregularities of the holder 34, variation in inclination between the sensor-side face 300 and the magnetic sensor 32 can be suppressed.

When a pre-formed sensor magnet 30 is fixed to the holder 34 by bonding, caulking, or other method, the sensor-side face 300 is disadvantageously inclined unless bonding profile irregularities between the holder 34 and the sensor magnet 30 are increased. Moreover, in order to secure bonding strength, it is required to secure a large bonding area, and hence it becomes more difficult to secure the bonding profile irregularities.

In contrast, in the case of the insert molding of this structure, it is only required that molding be performed to achieve the dimensional accuracy of the sensor-side face 300 with respect to the distal end portion 341 and the center axis of the pressure-contact portion 340, and hence it is easier to secure the accuracy as compared to the fixation by bonding or other method.

When the rotational position detecting device 3 is arranged on the side of the boss 42 configured to transfer the rotational force of the shaft 40, and the sensor magnet 30 has the annular shape and is arranged in the outer peripheral direction of the shaft 40, the degree of freedom in design of the motor 1 can be increased, and it is possible to achieve the rotational position detecting device 3 in which the variation in distance and the inclination between the sensor magnet 30 and the magnetic sensor 32 are suppressed.

Second Embodiment

Figure 3:
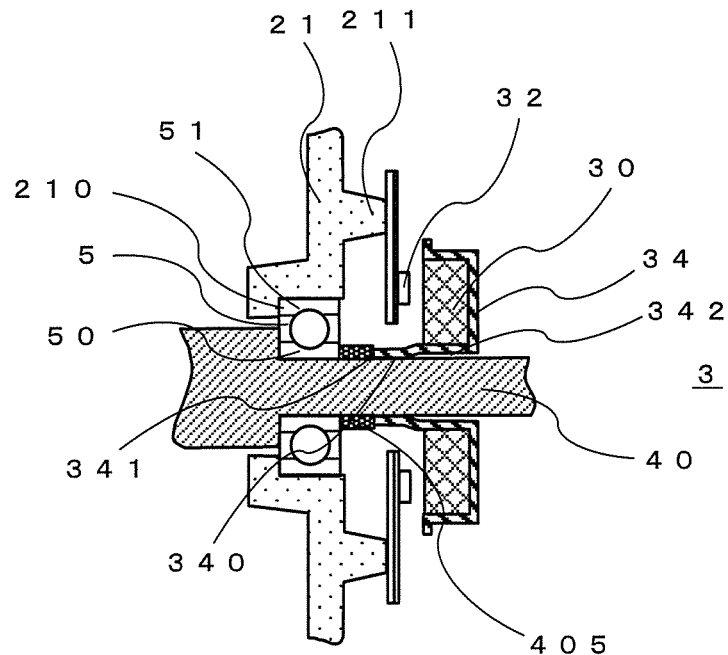
FIG. 3 is a sectional view of a rotational position detecting device according to a second embodiment of the present invention.

In a second embodiment of the present invention illustrated in FIG. 3, the step portion 403 between the small-diameter portion 401 and the large-diameter portion 402 in the first embodiment described above is omitted, and the large-diameter portion 402 of the shaft 40 in FIG. 2 is replaced by a shaft spacer 405 having an annular shape as a separate member. The shaft spacer 405 is arranged between the bearing inner ring 50 and the distal end portion 341 of the holder 34. Therefore, the holder 34 configured to hold the sensor magnet 30 is positioned by a dimension of the shaft spacer 405 in the axial direction. The shaft spacer 405 may be held in non-contact with, the bearing inner ring 50 and separated therefrom.

Next, actions and effects of the second embodiment of the present invention are described.

According to the second embodiment, through securing of the dimensional accuracy of the shaft spacer 405 in the axial direction, variation in distance between the sensor magnet 30 and the magnetic sensor 32 can be suppressed. As compared to the first embodiment described above, it is not required for the shaft 40 to achieve the dimensional accuracy between the bearing inner ring abutment portion 404 and the step portion 403, which is formed between the small-diameter portion 401 and the large-diameter portion 402.

Therefore, with the distal end portion 341 of the holder 34 configured to hold the sensor magnet 30 abutting against the shaft spacer 405 for assembly, assembly management can be easily carried out and the variation in distance between the sensor magnet 30 and the magnetic sensor 32 can be suppressed.

Third Embodiment

Figure 4:
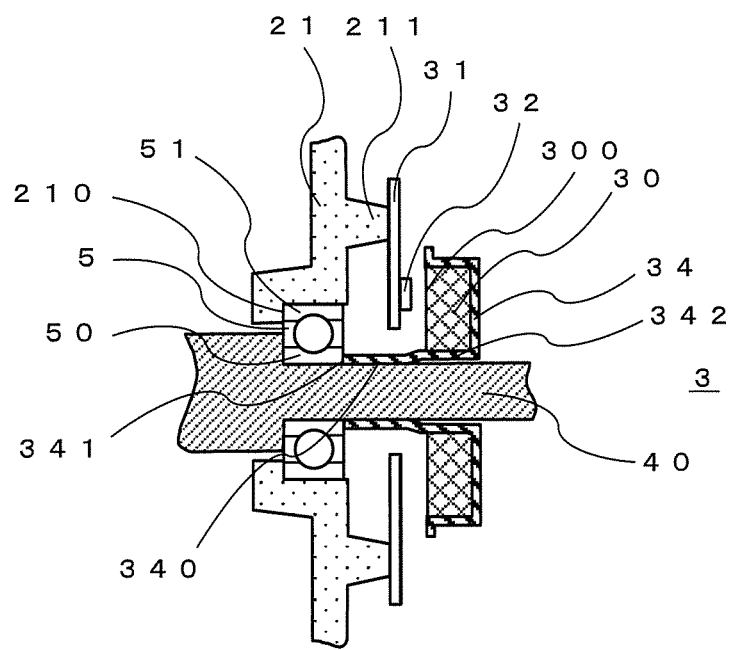
FIG. 4 is a sectional view of a rotational position detecting device according to a third embodiment of the present invention.

In a third embodiment of the present invention illustrated in FIG. 4, in the first embodiment described above, the large-diameter portion 402 of the shaft 40 in FIG. 2 is replaced by the bearing 5, in particular, the bearing inner ring 50. Therefore, the holder 34 configured to hold the sensor magnet 30 is positioned in such a manner that the pressure-contact portion 340 having a cylindrical shape is brought into abutment against the bearing inner ring 50 at the distal end portion 341 extending in the axial direction.

Next, actions and effects of the third embodiment of the present invention are described.

According to the third embodiment, through an increase in accuracy between the mounting face of the sensor magnet 30 to the holder 34, and the distal end portion 341 of the pressure-contact portion 340 extending in the axial direction, the variation in distance between the sensor magnet 30 and the magnetic sensor 32 can be suppressed.

Therefore, unlike the first embodiment, it is not required for the shaft 40 to achieve the dimensional accuracy between the bearing inner ring abutment portion 404 and the step portion 403, which is formed between the small-diameter portion 401 and the large-diameter portion 402. Moreover, as compared to the second embodiment described above, it is not required to achieve the dimensional accuracy of the shaft spacer 405 in the axial direction.

Therefore, with the holder 34 configured to hold the sensor magnet 30 abutting against the bearing inner ring 50 for assembly, assembly management can be easily carried out, and the variation in distance between the sensor magnet 30 and the magnetic sensor 32 can be suppressed.

Fourth Embodiment

Figure 5:
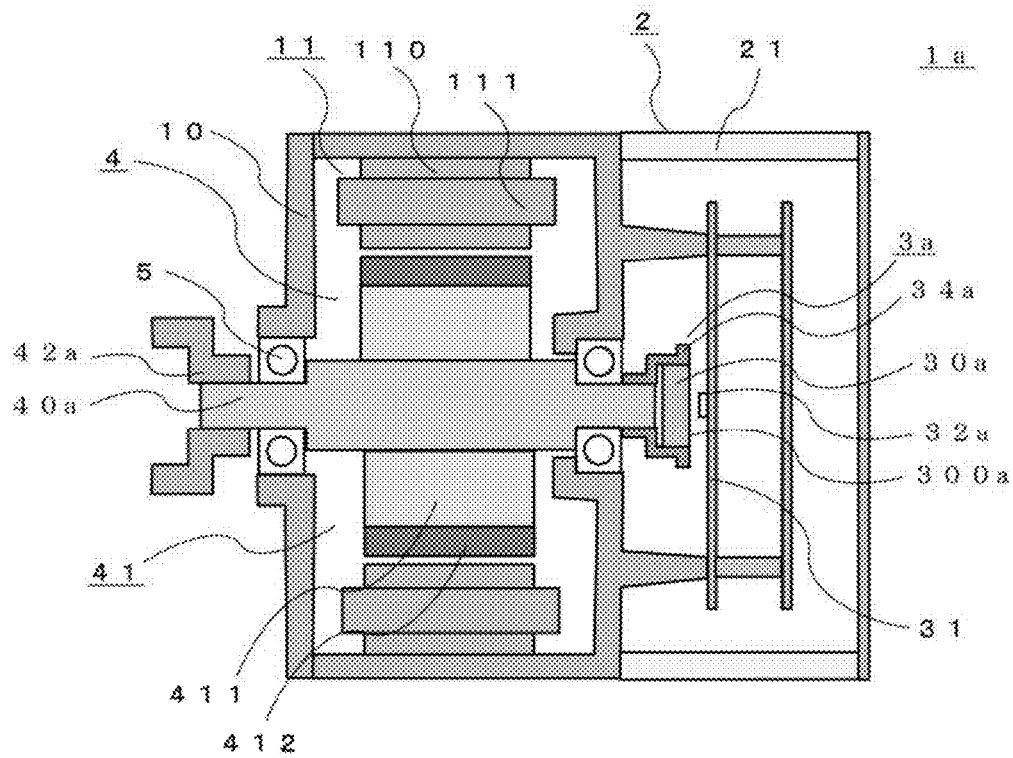
FIG. 5 is a sectional view of a motor including a rotational position detecting device according to a fourth embodiment of the present invention.

In a fourth embodiment of the present invention illustrated in FIG. 5, a motor 1a is configured such that a rotational position detecting device 3a is arranged on a side opposite to a side of a boss 42a configured to transfer rotational force of a shaft 40a. On this occasion, a sensor magnet 30a has a circular shape and is arranged at an end of the shaft 40a. Moreover, a magnetic sensor 32a is moved in a direction of extending an axis with respect to the sensor magnet 30a, and is arranged to be opposed to a sensor-side face 300a. The other configuration and roles are similar to those described above, and hence description thereof is omitted.

Next, effects of the fourth embodiment of the present invention are described.

According to the fourth embodiment, with the above-mentioned arrangement and configuration, effects similar to those of the third embodiment described above can be attained. Moreover, the motor 1a can be increased in the degree of freedom in design, and the rotational position detecting device 3a can be configured so that the variation in distance (including the inclination) between the sensor magnet 30a and the magnetic sensor 32a is suppressed.

Fifth Embodiment

Figure 6:
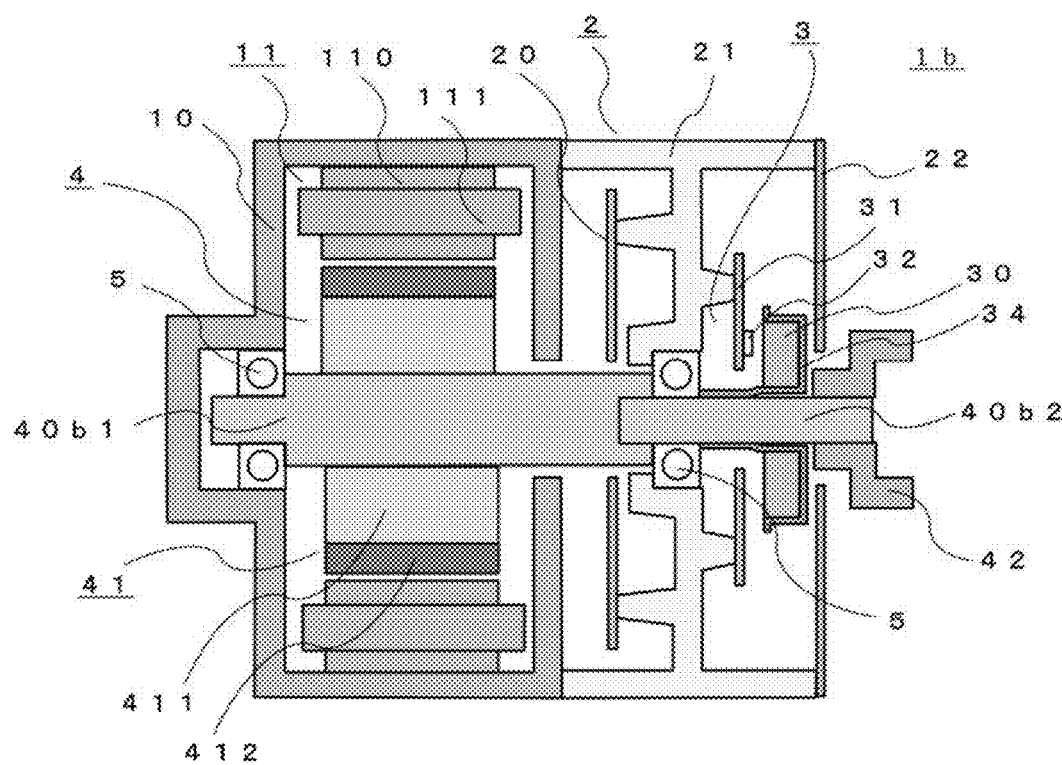
FIG. 6 is a sectional view of a motor including a rotational position detecting device according to a fifth embodiment of the present invention.

In a fifth embodiment of the present invention illustrated in FIG. 6, the same configuration is adopted except that the shaft 40 of the motor 1 of FIG. 4 includes a shaft 40b1 and a shaft 40b2 embedded in the shaft 40b1.

Specifically, the shaft 40b1 of the rotating body 4 is made of an S45C material or other magnetic material and forms the rotor side, and the shaft 40b2 is made of an SUS304 material or other non-magnetic material and forms a rotational position detecting device 3. Alternatively, the entirety of the shaft 40 of the motor 1 in FIG. 4 may be made of a non-magnetic material.

In the motor 1 during rotation operation, magnetic field noise is generated from the rotating magnetic field generated in the stator core 110, a magnetic flux of the magnet 412 of the rotating rotor 41, and the like. When the shaft 40 is made of a magnetic material, the magnetic field noise propagates through the shaft 40 and affects the magnetic sensor 32.

Next, actions and effects of the fifth embodiment of the present invention are described.

According to the fifth embodiment, the rotational position detecting device 3 is easily affected by the magnetic field noise for position sensing with the magnetic sensor 32. Therefore, it is desired that the rotational position detecting device 3 be arranged to be separated away from the stator core 110, the rotor 41, and the magnet 412.

The fifth embodiment has been made in view of those arrangement limitation, and it is possible to provide the rotational position detecting device 3 which is reduced in the number of components, enables easy assembly management, and achieves suppression of variation in distance (including the inclination) between the sensor magnet 30 and the magnetic sensor 32.

1, 1a, 1b motor, 10 motor housing, 2 controller, 20 control board, 21 controller housing, 22 controller cover, 3, 3a rotational position detecting device, 4 rotating body, 41 rotor, 411 rotor core, 412 magnet, 5 bearing, 50 bearing inner ring, 51 bearing outer ring, 11 stator, 110 stator core, 111 winding, 30, 30a sensor magnet, 31 magnetic sensor board, 32, 32a magnetic sensor, 34 holder, 40, 40a, 40b1, 40b2 shaft, 42, 42a boss, 210 bearing outer ring abutment portion, 211 substrate support portion, 300, 300a sensor-side face, 340 pressure-contact portion, 341 distal end portion, 342 shaft relief portion, 401 small-diameter portion, 402 large-diameter portion, 403, 404 step portion, 405 shaft spacer.

The invention claimed is:

1. A rotational position detecting device, comprising:
a sensor magnet configured to generate a magnetic flux;
a holder, which is configured to hold the sensor magnet, and has a pressure-contact portion to be fixed to a shaft of a motor; and
a magnetic sensor configured to detect the magnetic flux generated by the sensor magnet, the magnetic sensor being directly or indirectly fixed to the motor, and being arranged such that a gap exists between an entirety of the sensor magnet and an entirety of the magnetic sensor in an axial direction of the shaft,
the shaft having an abutment portion configured to receive a distal end portion of the pressure-contact portion such that an entire distal end face of the holder contacts the abutment portion of the shaft,
wherein the holder comprises a shaft relief portion contacting the sensor magnet and positioned between the sensor magnet and the shaft in a radial direction of the shaft.

2. The rotational position detecting device according to claim 1, wherein the abutment portion comprises a step portion formed by a diameter difference of the shaft.

3. The rotational position detecting device according to claim 1, wherein the abutment portion comprises an annular shaft spacer fixed to an outer periphery of the shaft.

4. The rotational position detecting device according to claim 1, wherein the abutment portion comprises a bearing provided so that the shaft is rotationally supported by a controller connected to the motor.

5. The rotational position detecting device according to claim 2, wherein the shaft includes: a large-diameter shaft made of a magnetic material; and a small-diameter shaft made of a non-magnetic material, the pressure-contact portion being fixed to the small-diameter shaft, the small-diameter shaft being fitted into the large-diameter shaft to form the step portion.

6. The rotational position detecting device according to claim 1, wherein the sensor magnet comprises an annular sensor magnet arranged in an outer peripheral direction of the shaft when being installed on a side of a boss mounted to the shaft.

7. The rotational position detecting device according to claim 1, wherein the sensor magnet comprises a circular sensor magnet arranged at an end portion of the shaft when being installed on a side opposite to a boss mounted to the shaft.

8. The rotational position detecting device according to claim 1, wherein the holder is made of a non-magnetic metal material.

9. The rotational position detecting device according to claim 1, wherein the shaft relief portion is located in a part on an inner periphery of the sensor magnet, and the shaft relief portion is configured to reduce stress generated on the sensor magnet by thermal expansion of the shaft.

10. The rotational position detecting device according to claim 1, wherein the holder is integrated to the sensor magnet by insert molding.

11. The rotational position detecting device according to claim 9, wherein the pressure-contact portion of the holder is located between the abutment portion of the shaft and the shaft relief portion of the holder, and wherein a diameter of the shaft relief portion is larger than a diameter of the pressure-contact portion.

12. The rotational position detecting device according to claim 1, wherein the shaft relief portion is positioned between the sensor magnet and the shaft without contacting the shaft.

13. The rotational position detecting device according to claim 1, wherein the pressure-contact portion of the holder is located between the abutment portion of the shaft and the shaft relief portion of the holder.

* * * * *